(12) United States Patent
Noguchi

(10) Patent No.: US 7,274,511 B2
(45) Date of Patent: Sep. 25, 2007

(54) ANTI-REFLECTION FILM, ORGANIC EL DEVICE, AND DISPLAY MEDIUM USING THE ANTI-REFLECTION FILM AND THE ORGANIC EL DEVICE

(75) Inventor: Takafumi Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/660,600

(22) Filed: Sep. 12, 2003

(65) Prior Publication Data

US 2004/0051950 A1    Mar. 18, 2004

(30) Foreign Application Priority Data

Sep. 13, 2002  (JP)  .............. 2002-267966
Sep. 30, 2002  (JP)  .............. 2002-286417

(51) Int. Cl.
*G02B 1/10* (2006.01)
(52) U.S. Cl. .................. 359/586; 359/588; 359/589
(58) Field of Classification Search ........... 359/570, 359/580, 586–589, 274, 577; 313/506
See application file for complete search history.

(56) References Cited

U.S. PATENT DOCUMENTS

| | | | | |
|---|---|---|---|---|
| 5,076,674 | A * | 12/1991 | Lynam | 359/274 |
| 5,147,125 | A * | 9/1992 | Austin | 359/359 |
| 5,362,552 | A * | 11/1994 | Austin | 428/216 |
| 5,508,091 | A * | 4/1996 | Austin | 428/216 |
| 6,280,848 | B1 * | 8/2001 | Okumura et al. | 428/426 |
| 6,628,064 | B1 * | 9/2003 | Miura | 313/479 |
| 6,667,788 | B1 | 12/2003 | Maruyama et al. | |
| 6,696,177 | B1 | 2/2004 | Hatwar | |
| 6,836,068 | B2 * | 12/2004 | Furugori et al. | 313/506 |
| 6,867,833 | B2 * | 3/2005 | Chang et al. | 349/114 |
| 6,911,963 | B2 * | 6/2005 | Baba et al. | 345/88 |

FOREIGN PATENT DOCUMENTS

| | | |
|---|---|---|
| JP | 04-051491 A | 2/1992 |
| JP | 08-078163 A | 3/1996 |
| JP | 2000-356769 A | 12/2000 |
| JP | 2001-155866 A | 6/2001 |
| JP | 2002-093583 A | 3/2002 |

OTHER PUBLICATIONS

Office Action JPA 2002-286417, Japanese Patent Office, July 10, 2002.

* cited by examiner

*Primary Examiner*—Leonidas Boutsikaris
(74) *Attorney, Agent, or Firm*—Sughrue Mion, PLLC

(57) ABSTRACT

The anti-reflection film has reflectance minimums in at least prime colors. The reflective display medium has the reflectance minimums in at least the prime colors. The light emitting display medium has the reflectance minimums in at least the prime colors, and having light emission maximums in the prime colors. The organic EL device has the light emission maximums in the prime colors. The liquid crystal monitor has the reflectance minimums in at least the prime colors, and uses as a supplemental light source the organic EL device.

28 Claims, 2 Drawing Sheets

ANTI-REFLECTION FILM, ORGANIC EL DEVICE, AND DISPLAY MEDIUM USING THE ANTI-REFLECTION FILM AND THE ORGANIC EL DEVICE

BACKGROUND OF THE INVENTION

1. Field of the Invention

The present invention relates to an anti-reflection film, to an organic EL (Electro Luminescence) device, and to a display medium that uses the anti-reflection film and the organic EL device. In particular, the present invention relates to an anti-reflection film that suppresses reflectance in three light emission peak wavelengths in a light source that has light emission peaks in the so-called primary colors, such as a three band fluorescent lamp. The present invention also relates to a three band organic EL device having light emission peaks in the primary colors, and to a display device such as a liquid crystal monitor, which uses the anti-reflection film and the three band organic EL device.

2. Description of the Related Art

There is a harmful effect in conventional optical components such as lenses made from optical glass having a relatively large index of refraction. If light incident to the optical component reflects off a surface of the optical component, transmittivity will drop by the amount of light reflected, and/or a projection into the surface due to the reflection will develop.

With eyeglasses, for example, the amount of light that passes through an eyeglass lens is further reduced in the evening, when the amount of light is insufficient, and it becomes very hard to see. Further, several lenses are combined together in a camera lens, and therefore the amount of light that passes through the camera lens is reduced by the amount of lenses combined, and a screen becomes darker. Furthermore, for cases of a display medium such as a television monitor, external light such as that from lighting and the like is reflected by a display screen, leading to projections and flaring, and markedly worsening visibility.

An anti-reflection film has generally been implemented in conventional optical components such as lenses in order to prevent such harmful effects due to reflection by these types of surfaces.

Single layer films such as magnesium fluoride ($MgF_2$), for example, are used as the anti-reflection film. A thin film of the anti-reflection film is formed at a thickness of one-quarter of the wavelength of light on a surface of the lens. Light reflected from a front surface and light reflected from a rear surface will mutually cancel out due to interference, thus suppressing reflected light. However, the reflection of only one wavelength of light can be suppressed with a single-layer film, and in practice a multi-layer anti-reflection film that combines several layers is used.

The multi-layer anti-reflection film is, for example, a film in which multiple layers of substances having different indexes of refraction are evaporated on a glass substrate.

Specifically, magnesium fluoride may be used as the film material in order to suppress green light reflection, for example. The wavelength of green light is 550 nm, and the index of refraction of magnesium fluoride is 1.39. The wavelength within the film therefore becomes 396 nm, and the film may be formed having a thickness of one-quarter of this wavelength, which is 99 nm.

As described above, however, this film alone can only suppress the reflection of one wavelength of light (green light) at 550 nm. A multiple-layer film in which several layers overlap is therefore made using the same principle. The amount of reflection that is suppressed naturally increases as the number of layers increases, and the amount of light incident to an inside portion also becomes greater.

The anti-reflection film is normally designed to reduce the reflectance over the entire visible region.

The manner in which colors of objects are seen differs according to the type of light source present. For example, faces and clothing that can be seen naturally under sunlight take on an unnatural orange color under tunnel lighting, such as low voltage sodium lamps. That is, sunlight, under which the colors of objects can be seen naturally, is considered as "good lighting". Tunnel lighting, under which the colors of objects are seen as unnatural, is considered as "poor lighting".

The fact that colors of objects can be seen differently according to the type of light source present is referred to as "color rendering", and this becomes one standard for determining lighting quality. The color rendering standard for lighting quality has been quantified as a color rendering index, and the color rendering index is formulated by the Commission Internationale de l'Eclairage (CIE) and by Japan Industrial Standards (JIS).

For example, it is said to be desirable to make the light emission peaks (light emission maxima) conform to the so-called primary colors in order to maximize the color reproducibility of a monitor, or the color rendering of a fluorescent light.

Note that the term "primary colors" as used here refers to colors having wavelengths in the vicinity of 450 nm, 540 nm, and 610 nm (for example, these values ±20 nm), colors to which the human eye is most sensitive. Specifically, this is discussed in: Thornton, W. A., "Matching Lights, Metamers, and Human Visual Response", J. Color and Appearance, 2(1), pp. 23-9 (1973); Brill, M. H., Finlayson, D., Hubel, P. M., and Thornton, W. A., "Prime Colors and Color Imaging", Proc. IS&T/SID 6th Color Imaging Conference, pp. 33-42 (1998); Finlayson, G. D., and Morovic, P. M., "Metamer Crossovers of Infinite Metamer Sets", Proc. IS&T/SID 8th Color Imaging Conference, pp. 13-7 (2000), and the like.

Three band fluorescent lamps, for example, which are often used for lighting and as backlights of liquid crystal displays and the like, possess light emission peaks in three wavelengths, 435 nm, 545 nm, and 610 nm.

Further, using organic light emitting devices that utilize organic substances, in particular organic EL devices (organic Electro Luminescence devices), as low cost, large surface area, full color solid state display devices, is promising, and much development is being performed toward this end.

Organic EL devices are devices that cause fluorescent or phosphorescent organic molecules contained in an organic compound sandwiched between two electrodes, a cathode and an anode, to emit light in accordance with an electric current that flows in the organic compound.

This light emission is a phenomenon in which electrons are injected from the cathode, and positive holes are injected from the anode, when an electric field is applied between both of the electrodes that sandwich an organic compound light emitting layer. The electrons and the holes recombine in the light emitting layer, and energy is released as light when the energy level returns to a valence band from a conduction band.

This type of organic EL device is a device that is expected to be developed and applied to self-light emitting displays, liquid crystal monitor backlights, lighting, and the like. No matter how the organic EL devices are used, it is still desirable that the light emission maxima of the organic EL devices conform to the primary colors in order to maximize the color reproducibility and the color rendering of the organic EL devices.

Further, although it is expected that the organic EL devices will be used as backlights for liquid crystal monitors, as discussed above, three band fluorescent lamps are conventionally used as the liquid crystal monitor backlights.

That is, the liquid crystal monitors have an anti-reflection film and a supplemental light source. The supplemental light source of the liquid crystal monitors is a backlight for transmission liquid crystals, and lighting for reflective liquid crystals, while both the backlight and the lighting are employed for translucent liquid crystals.

Conventionally, a film having a low reflectance across the entire visible light region is used in the anti-reflection film, and a three band fluorescent lamp is used as the supplemental light source.

However, fluorescent lamps used in lighting and monitors (display media) such as cathode ray tubes, liquid crystal display, and the like are the main sources of light emission in the present-day office environment.

Furthermore, fluorescent lamps are generally used in liquid crystal display backlights, and it can therefore be said that nearly all of the light that enters the human eye in this environment is light from fluorescent lamps and monitors such as cathode ray tubes.

The light emission peaks of fluorescent lamps and these types of monitors are designed to conform as much as possible to the primary colors in order to maximize the color reproducibility and the color rendering of the fluorescent lamps and the monitors.

The light that enters the human eye in the present-day office environment therefore is mostly composed of the primary colors (including the vicinity of the primary colors). It is not necessary for the anti-reflection film to control reflection of all visible light regions in this type of environment, as long as the reflectance of the primary colors (including the vicinity of the primary colors) is controlled.

Considering monitor visibility, however, light emission from the fluorescent lights used as external light and light emission from the monitor backlights have identical wavelengths, and therefore a high precision is required in controlling the surface reflection of the primary color wavelengths.

There is a problem, however, with conventional anti-reflection films in that necessary and sufficient anti-reflection function cannot be obtained under the present-day office environment as described above.

Further, the organic EL devices described above are expected to be developed and applied in various areas, such as natural light displays, liquid crystal monitor backlights, and lighting, but the maximum light emission of the organic EL devices does not match the primary colors. There is a problem in that current organic EL devices are not sufficient for these applications.

In addition, the function of the organic EL devices is not sufficient for cases of using a conventional film that has a low reflectance across the entire visible light region as an anti-reflection film for a liquid crystal monitor under the present-day office environment, where nearly all of the light that enters the human eye is light from fluorescent lights and light from monitors such as cathode ray tubes. Further, mercury and fluorescent coatings are used when a three band fluorescent lamp is employed in the backlight of a liquid crystal monitor, and this is a problem because it is not ecologically desirable.

SUMMARY OF THE INVENTION

In view of the conventional problems discussed above, a first object of the present invention is to provide an anti-reflection film that possesses a necessary and sufficient anti-reflection function under an office environment where nearly all light emission sources have light emission peaks in the primary colors, to which the human eye is most sensitive; and a display medium that uses the anti-reflection film.

Further, in view of the conventional problems discussed above, a second object of the present invention is to provide an organic EL device that can maximize color reproducibility and color rendering when using the organic EL device in lighting, in a supplemental light source of a liquid crystal monitor, or the like, that has sufficient function under a present-day office environment, and in addition, has no ecological problems; and a liquid crystal monitor using the organic EL device.

In order to attain the first object described above, the first aspect of the present invention provides an anti-reflection film having reflectance minima in at least primary colors.

In order to attain the first object described above, the second aspect of the present invention provides a light emitting display medium having reflectance minima in at least primary colors, and having light emission maxima in the primary colors.

It is preferable that reflection function of the display medium having the reflectance minima in at least the primary colors, is obtained by applying on a display screen of the display medium an anti-reflection film having the reflectance minima in at least the primary colors.

In order to attain the first object described above, the third aspect of the present invention provides a light reflective display medium having reflectance minima in at least primary colors.

It is preferable that reflection function of the display medium having reflectance minima in at least the primary colors, is obtained by applying on a display screen of the display medium an anti-reflection film having the reflectance minima in at least the primary colors.

In order to attain the second object described above, the fourth aspect of the present invention provides an organic EL device having light emission maxima in primary colors.

It is preferable that the organic EL device has the reflectance minima in at least the primary colors.

It is further preferable that reflection function of the organic EL device having the reflectance minima in at least the primary colors, is obtained by applying on a display screen of the organic EL device an anti-reflection film having the reflectance minima in at least the primary colors.

In order to attain the second object-described above, the five aspect of the present invention provides an liquid crystal monitor using an organic EL device, which has reflectance minima in at least primary colors, and uses as a supplemental light source an organic EL device having light emission maxima in the primary colors.

DETAILED DESCRIPTION OF THE PREFERRED EMBODIMENTS

Figure 1A:
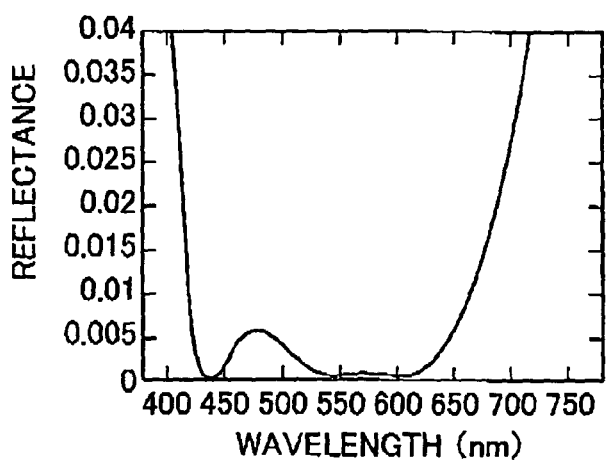
FIGS. 1A, 1B, and 1C are diagrams that show the reflection characteristics of three types of anti-reflection films relating to an embodiment of the present invention.
Figure 1B:
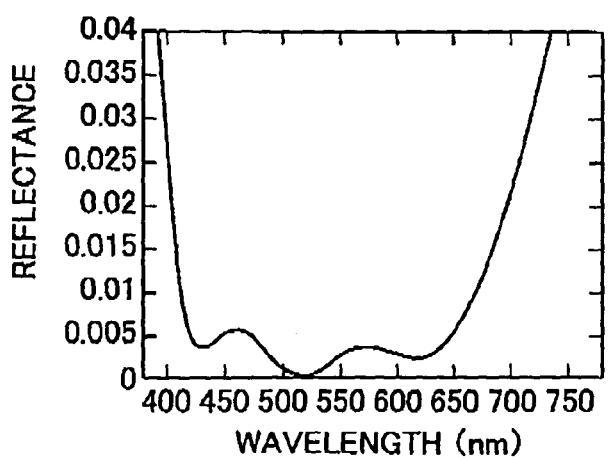
Figure 1C:
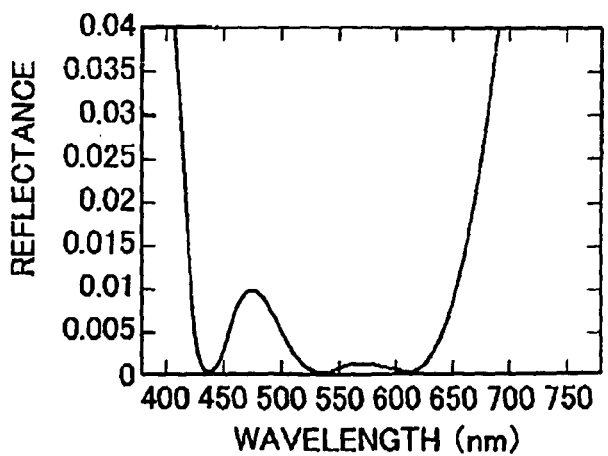

Referring to FIGS. 1A to 1C, an anti-reflection film of an embodiment of a first aspect of the present invention, and display mediums of embodiments of a second aspect and a third aspect of the present invention that use the anti-reflection film, are explained first below in detail.

Consider the present-day office environment, where nearly all light emission sources are three band fluorescent lamps or the like that have light emission peaks in the so-called primary colors (including the vicinity of the primary colors). An anti-reflection film according to the present invention is a film in which the film thickness and the index of refraction of each layer structuring the anti-reflection film are designed to minimize reflectance in the primary colors in order to control the reflection of light having the wavelengths of the primary colors.

The term "primary colors" refers to colors in the vicinity of wavelengths to which the human eye is most sensitive. In the present invention, it is preferable that the primary colors be in ranges of 450±20 nm, 540±20 nm, and 610±20 nm.

In addition, it is more preferable that the primary colors be in ranges of 440±10 nm, 540±10 nm, and 610±10 nm.

The anti-reflection film is therefore structured in the first embodiment of the present invention to have minimum reflectance in at least these three wavelength regions. That is, the anti-reflection film of this embodiment has three or more reflectance minima, and the wavelengths of three of the reflectance minima conform to the ranges of the primary colors described above.

Table 1 shows layer structures of the anti-reflection film according to the first embodiment of the present invention. There are two types of structures, A and B, in each of which 6 layers of thin films are formed on a transparent glass substrate, and one structure in which 7 layers of thin films are formed on the transparent glass substrate, as shown in Table 1.

The index of refraction of the glass substrate is 1.53, and the index of refraction of air is taken as 1.00. Each of the thin films shown in Table 1 is formed on the glass substrate by evaporation.

TABLE 1

| Layer number | 6-Layer structure A | | 6-Layer structure B | | 7-Layer structure | |
|---|---|---|---|---|---|---|
| | Index of refraction | Film thickness (nm) | Index of refraction | Film thickness (nm) | Index of refraction | Film thickness (nm) |
| Glass | 1.53 | | 1.53 | | 1.53 | |
| 1 | 1.40 | 93.10 | 1.42 | 91.30 | 1.64 | 92.50 |
| 2 | 1.46 | 94.40 | 1.45 | 92.00 | 1.47 | 90.60 |
| 3 | 1.78 | 95.40 | 1.70 | 97.30 | 1.40 | 91.20 |
| 4 | 1.81 | 92.30 | 1.77 | 92.30 | 1.66 | 99.40 |
| 5 | 1.90 | 92.90 | 1.88 | 93.90 | 1.74 | 95.80 |
| 6 | 1.40 | 90.90 | 1.40 | 91.00 | 1.89 | 93.20 |
| 7 | | | | | 1.40 | 91.00 |
| Air | 1.00 | | 1.00 | | 1.00 | |

As shown in Table 1, the anti-reflection film of the 6-layer structure A has a structure in which a first layer having an index of refraction of 1.40 and a film thickness of 93.10 nm, a second layer having an index of refraction of 1.46 and a film thickness of 94.40 nm, a third layer having an index of refraction of 1.78 and a film thickness of 95.40 nm, a fourth layer having an index of refraction of 1.81 and a film thickness of 92.30 nm, a fifth layer having an index of refraction of 1.90 and a film thickness of 92.90 nm, and a sixth layer having an index of refraction of 1.40 and a film thickness of 90.90 nm are formed on the glass substrate.

Further, the anti-reflection film of the 6-layer structure B has a structure in which a first layer having an index of refraction of 1.42 and a film thickness of 91.30 nm, a second layer having an index of refraction of 1.45 and a film thickness of 92.00 nm, a third layer having an index of refraction of 1.70 and a film thickness of 97.30 nm, a fourth layer having an index of refraction of 1.77 and a film thickness of 92.30 nm, a fifth layer having an index of refraction of 1.88 and a film thickness of 93.90 nm, and a sixth layer having an index of refraction of 1.40 and a film thickness of 91.00 nm are formed on the glass substrate.

Further, the anti-reflection film of the 7-layer structure has a structure in which a first layer having an index of refraction of 1.64 and a film thickness of 92.50 nm, a second layer having an index of refraction of 1.47 and a film thickness of 90.60 nm, a third layer having an index of refraction of 1.40 and a film thickness of 91.20 nm, a fourth layer having an index of refraction of 1.66 and a film thickness of 99.40 nm, a fifth layer having an index of refraction of 1.74 and a film thickness of 95.80 nm, a sixth layer having an index of refraction of 1.89 and a film thickness of 93.20 nm, and a seventh layer having an index of refraction of 1.40 and a film thickness of 91.00 nm are formed on the glass substrate.

The reflection characteristics of the three types of anti-reflection films are shown in FIGS. 1A to 1C.

FIG. 1A shows the reflection characteristics of the anti-reflection film having the 6-layer structure A of Table 1, FIG. 1B shows the reflection characteristics of the anti-reflection film having the 6-layer structure B of Table 1, and FIG. 1C shows the reflection characteristics of the anti-reflection film having the 7-layer structure of Table 1.

As understood from FIG. 1A, FIG. 1B, and FIG. 1C, each of the anti-reflection films has reflectance minima in the primary colors (including the vicinity of the primary colors) at 440±10 nm, 540±10 nm, and 610±10 nm.

Three band anti-reflection films having reflectance minima in the primary colors can thus be obtained by this embodiment.

Note that, although the anti-reflection films of the example explained above are films that have three minima in the primary colors, the present invention is not limited to such films. Anti-reflection films that possess three or more minima, where three of the minima are in the primary color (including the vicinity of the primary color), may be used.

The second embodiment of the present invention is explained next.

The second embodiment is a light emitting display medium (or device) in which the (three band) anti-reflection film explained by the first embodiment, which has reflectance minima in at least the primary colors, is applied to a cathode ray tube monitor.

For cases in which interior room lighting is a three band fluorescent lamp, reflection in the three wavelengths (primary colors), which are the light emission peaks of the fluorescent lamp, are controlled by the (three band) anti-reflection film applied to the cathode ray tube monitor. Lighting projections can thus be minimized.

Further, the light emission of the cathode ray tube monitor also has three light emission peaks in the prime colors as described above. Reflections of the light emitted from the cathode ray tube monitor are also controlled in the light emission peaks (primary colors) by the anti-reflection film that is applied to the monitor. Light transmits well, and is emitted to the outside, and therefore the light emission efficiency of the cathode ray tube monitor is maximized. The visibility of the cathode ray tube monitor is thus maximized.

Further, an example in which the (three band) anti-reflection film of the first embodiment is applied to a transmission liquid crystal monitor can be considered as another example of the second embodiment.

In this case as well, the lighting and the liquid crystal monitor backlight, when they are both three band fluorescent lamps, have light emission peaks in the primary colors. Therefore the light taken in is maximized, projection is minimized, and visibility is maximized, similar to the structure discussed above.

The third embodiment of the present invention is explained next.

The third embodiment is a light reflective display medium (or device) in which the (three band) anti-reflection film of the first embodiment is applied to a reflective liquid crystal monitor.

When lighting is a three band fluorescent lamp, reflections are controlled in the primary colors, which are the light emission peaks of the three band fluorescent lamp. As a result, light having the wavelengths of the light emission peaks is taken in within the liquid crystal. There is a white diffuser panel in back of the reflective liquid crystal monitor, and this diffuser panel reflects all incident light.

Light that is thus reflected, and then returns to a monitor surface, is controlled from being reflected again in the primary colors by the anti-reflection film. The light that is taken in within the liquid crystals therefore exits to the outside of the liquid crystal monitor as it is.

Therefore, the light taken in is maximized, projection of the lighting is minimized, and visibility is maximized in this case as well.

Further, in the reflective liquid crystal monitor, an RGB filter is disposed on a surface of the liquid crystal monitor so that the light that has entered within the liquid crystal monitor is modulated into RGB when the light is let out from the inside of the liquid crystal monitor. It is preferable that the color filter possess maxima of transmittivity in the primary colors.

The light taken in by the reflective liquid crystal monitor thus increases, and the visibility also increases.

Figure 2:
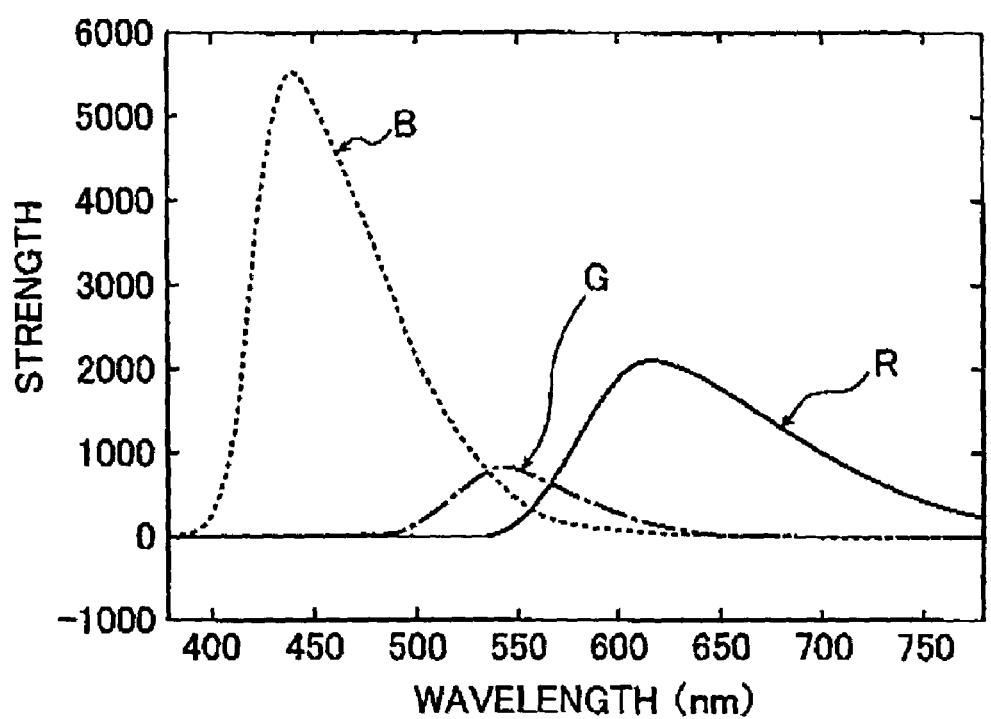
FIG. 2 is a diagram that shows light emission waveforms of a light emitting material used in an organic EL device of an embodiment of the present invention.

Referring to FIG. 2, an organic EL device of a fourth aspect of the present invention, and a liquid crystal monitor of a fifth aspect of the present invention, are explained below.

The fourth embodiment of the present invention is explained first. The fourth embodiment is an embodiment that relates to an organic EL device having light emission maxima in the primary colors.

The organic EL device of this embodiment is structured by laminating a transparent electrode, an organic compound layer, and a back electrode on a substrate. The structure also has other layers, such as a protective layer, when necessary.

A three band organic EL device is structured to have light emission maxima in the primary colors in this embodiment by using singlet light emitting materials like those shown hereinafter in a light emitting layer of the organic compound.

Note that, as discussed above, the term "primary colors" refers to colors having wavelengths in the vicinity of 450 nm, 540 nm, and 610 nm (these wavelengths ±20 nm), to which the human eye is most sensitive.

In addition, it is preferable that the primary colors be 440±10 nm, 540±10 nm, and 610±10 nm in the present invention.

First, a compound shown by the following chemical formula (1) is used as a light emitting material that displays blue color (B) fluorescent light emission, having a maximum wavelength of light emission at 443 nm.

Note that details regarding this chemical compound are cited in JP 2001-192653 A.

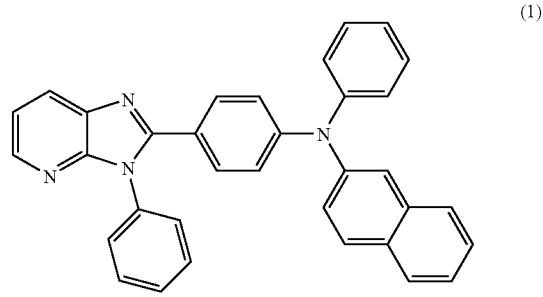

(1)

Further, a compound shown by the following chemical formula (2) is used as a light emitting material that displays green color (G) fluorescent light emission, having a maximum wavelength of light emission at 547 nm.

Note that details regarding this chemical compound are cited in JP 2001-354955 A.

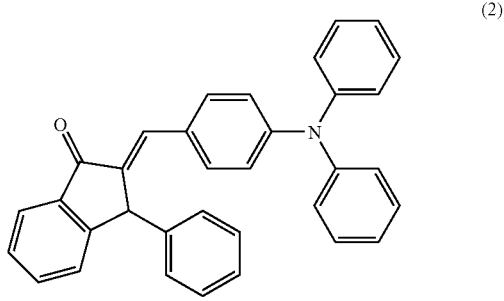

(2)

Further, a compound shown by the following chemical formula (3) is used as a light emitting material that displays red color (R) fluorescent light emission, having a maximum wavelength of light emission at 615 nm.

Note that details regarding this chemical compound are cited in JP 2001-273977 A.

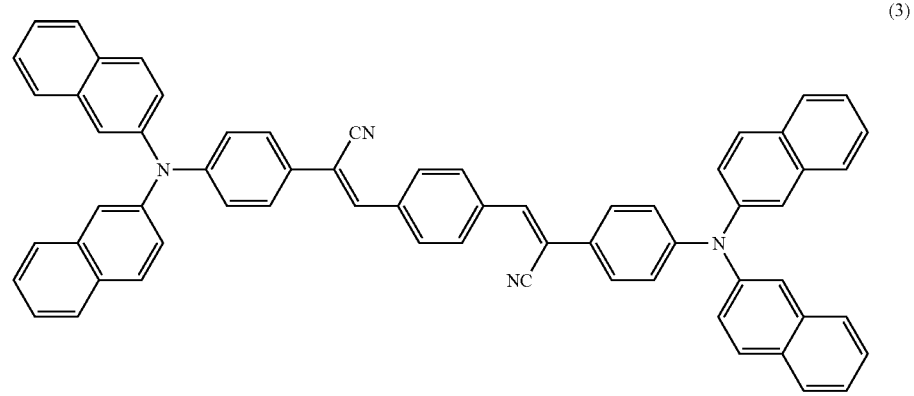

(3)

Further, light emission waveforms of the light emitting materials that correspond to B, G, and R are shown in FIG. 2.

The organic EL device is constructed by using these light emitting materials. The organic EL device having light emission maxima in the primary colors as shown by the light emission waveforms of FIG. 2 can thus be achieved.

The organic EL device is made to emit light in such a way that the organic EL device is the same color temperature as each of normal fluorescent lamps (F1 to F6), high color rendering fluorescent lamps (F7 to F9), and three band fluorescent lamps (F10 to F12), thereby comparing the color rendering indexes for the organic EL device with the color rendering indexes for the respective fluorescent lamps. The results thereof are shown in Table 2.

As shown in Table 2, the organic EL device of this embodiment does not equal the high color rendering fluorescent lamps F7 to F9 in color rendering, but does have a higher color rendering index than the normal fluorescent lamps F1 to F6 and the three band fluorescent lamps F10 to F12. It can be seen that the organic EL device of this embodiment is superior to the normal fluorescent lamps F1 to F6 and the three band fluorescent lamps F10 to F12.

The organic EL device of this embodiment thus has light emission maxima in the primary colors, and therefore a high quality self-light emitting display, in which color reproducibility is maximized, can be structured by using the organic EL device.

TABLE 2

| | Fluorescent lamp | | Organic EL |
|---|---|---|---|
| Type | Color temperature | Color rendering index | Color rendering index |
| F1 | 6430 K | 76 | 84.1 |
| F2 | 4230 K | 64 | 86.3 |
| F3 | 3450 K | 57 | 86.6 |
| F4 | 2940 K | 51 | 86.8 |
| F5 | 6350 K | 72 | 81.2 |
| F6 | 4150 K | 59 | 83.6 |
| F7 | 6500 K | 90 | 87.3 |
| F8 | 5000 K | 95 | 85.8 |
| F9 | 4150 K | 90 | 87.4 |
| F10 | 5000 K | 81 | 85.7 |
| F11 | 4000 K | 83 | 87.3 |
| F12 | 3000 K | 83 | 86.5 |

The fifth embodiment of the present invention is explained next.

As described above, a high quality self-light emitting display can be structured by using the organic EL device of the fourth embodiment. However, there are cases in which visibility deteriorates due to lighting projections onto a surface of the display under the present-day office environment, where three band fluorescent lamps are used in lighting.

In the fifth embodiment, an anti-reflection film having reflectance minima in the primary colors, 450±20 nm, 540±20 nm, and 610±20 nm, is applied to a surface of a monitor that uses the organic EL device of the fourth embodiment described above.

Applying the anti-reflection film, which has reflectance minima in the primary colors, can thus control reflection of light from three band fluorescent lamp and other lighting, which has light emission maxima in the primary colors. The projections onto the monitor surface can therefore be minimized.

Further, the anti-reflection film having reflectance minima in the primary colors is applied, and therefore reflection of light in the primary colors emitted by the (three band) organic EL device of the present invention, which are structured to have light emission maxima in the primary colors, is controlled. The transmittivity of the anti-reflection film is increased, and it becomes easier for light to exit to the outside. Color reproducibility and visibility are both maximized.

A sixth embodiment of the present invention is explained next.

The sixth embodiment is an embodiment in which a liquid crystal monitor having sufficient function under the present-day office environment, and in addition, having no ecological problems, is structured by using the organic EL device of the present invention.

The liquid crystal monitor of this embodiment is one in which an anti-reflection film having reflectance minima in the primary colors is applied to a surface of the monitor. The liquid crystal monitor of this embodiment uses the organic EL device of the fourth embodiment, which has light emission maxima in the primary colors, in a supplemental light source.

A backlight is used as the supplemental light source of the liquid crystal monitor if the liquid crystal monitor has transmission liquid crystals, and lighting is used as the supplemental light source if the liquid crystal monitor has reflective liquid crystals, as described above. Both the backlight and the lighting are used as the supplemental light source if the liquid crystal monitor has translucent liquid crystals.

Further, as described above, it is preferable that the primary colors be in ranges of 450±20 nm, 540±20 nm, and 610±20nm. It is more preferable that the primary colors be in ranges of 440±10 nm, 540±10 nm, and 610±10 nm.

In this embodiment, the anti-reflection film having reflectance minima in the primary colors is applied to the monitor surface of the liquid crystal monitor, and the organic EL device having light emission maxima in the primary colors is used as the supplemental light source for the liquid crystal monitor. Projections onto the monitor surface are therefore minimized, and visibility is maximized. Accordingly, sufficient function can be achieved under the present-day office environment, and there are no ecological problems.

The anti-reflection film and the organic EL device of the present invention, and the display medium that uses the anti-reflection film and the organic EL device, are explained in detail above. However, the present invention is not limited to the embodiments described above. All types of improvements and changes may also be performed within a scope that does not deviate from the gist of the present invention.

As explained above, in accordance with the first to third aspects of the present invention, it becomes possible to obtain an anti-reflection film that possesses a necessary and sufficient anti-reflection function, and that is capable of increasing visibility of a display medium, under the present-day office environment where nearly all light emission sources have light emission peaks in the primary colors, to which the human eye is most sensitive. It also becomes possible to obtain a display medium that uses the anti-reflection film.

Further, in accordance with the fourth and the fifth aspects of the present invention, for cases in which the organic EL device is used in lighting, in a supplemental light source of a liquid crystal monitor, or the like, there are superior effects in which color reproducibility and color rendering can be maximized, in which sufficient function can be achieved under a present-day office environment, and in addition, in which there are no ecological problems.

What is claimed is:

1. An anti-reflection film having
reflectance minima in at least three wavelength regions containing respective three wavelength regions of three primary colors, said anti-reflection film comprising:

a structure of 6 layers of thin films which are different from each other in at least one of an index of refraction and a film thickness, wherein said structure of said 6 layers of thin films comprises a first layer having an index of refraction 1.40 and a film thickness of 93.10 nm, a second layer having an index of refraction of 1.46 and a film thickness of 94.40 nm, a third layer having an index of refraction of 1.78 and a film thickness of 95.40 nm, a fourth layer having an index of refraction of 1.81 and a film thickness of 92.30 nm, a fifth layer having an index of refraction of 1.90 and a film thickness of 92.90 nm, and a sixth layer having an index of refraction of 1.40 and a film thickness of 90.90 nm.

2. A self-light emitting display medium, comprising:

a self-light emitting display having light emission maxima in respective three wavelength regions of three primary colors; and an anti-reflection film applied on a front surface of a display screen of said self-light emitting display and having reflectance minima in at least three wavelength regions containing said respective three wavelength regions of said three primary colors, wherein said anti-reflection film comprises: a structure of 6 or 7 layers of thin films which are different from each other in at least one of an index of refraction and a film thickness, and wherein said structure of said 6 layers of thin films comprises a first layer having an index of refraction 1.40 and a film thickness of 93.10 nm, a second layer having an index of refraction of 1.46 and a film thickness of 94.40 nm, a third layer having an index of refraction of 1.78 and a film thickness of 95.40 nm, a fourth layer having an index of refraction of 1.81 and a film thickness of 92.30 nm, a fifth layer having an index of refraction of 1.90 and a film thickness of 92.90 nm, and a sixth layer having an index of refraction of 1.40 and a film thickness of 90.90 nm, or a first layer having an index of refraction of 1.42 and a film thickness of 91.30 nm, a second layer having an index of refraction of 1.45 and a film thickness of 92.00 nm, a third layer having an index of refraction of 1.70 and a film thickness of 97.30 nm, a fourth layer having an index of refraction of 1.77 and a film thickness of 92.30 nm, a fifth layer having an index of refraction of 1.88 and a film thickness of 93.90 nm, and a sixth layer having an index of refraction of 1.40 and a film thickness of 91.00 nm, or said structure of said 7 layers of thin films comprises a first layer having an index of refraction of 1.64 and a film thickness of 92.50 nm, a second layer having an index of refraction of 1.47 and a film thickness of 90.60 nm, a third layer having an index of refraction of 1.40 and a film thickness of 91.20 nm, a fourth layer having an index of refraction of 1.66 and a film thickness of 99.40 nm, a fifth layer having an index of refraction of 1.74 and a film thickness of 95.80 nm, a sixth layer having an index of refraction of 1.89 and a film thickness 93.20 nm, and a seventh layer having an index of refraction of 1.40 and a film thickness of 91.00 nm.

3. A liquid crystal display medium, comprising:

a liquid crystal display;

an anti-reflection film applied on a front surface of a display screen of said liquid crystal display and having reflectance minima in at least three wavelength regions containing respective three wavelength regions of three primary colors; and one or more three band fluorescent lamps as a backlight source having light emission maxima in said respective three wavelength regions of said three primary colors, wherein said anti-reflection film comprises: a structure of 6 or 7 layers of thin films which are different from each other in at least one of an index of refraction and a film thickness, and wherein said structure of said 6 layers of thin films comprises a first layer having an index of refraction 1.40 and a film thickness of 93.10 nm, a second layer having an index of refraction of 1.46 and a film thickness of 94.40 nm, a third layer having an index of refraction of 1.78 and a film thickness of 95.40 nm, a fourth layer having an index of refraction of 1.81 and a film thickness of 92.30 nm, a fifth layer having an index of refraction of 1.90 and a film thickness of 92.90 nm, and a sixth layer having an index of refraction of 1.40 and a film thickness of 90.90 nm, or a first layer having an index of refraction of 1.42 and a film thickness of 91.30 nm, a second layer having an index of refraction of 1.45 and a film thickness of 92.00 nm, a third layer having an index of refraction of 1.70 and a film thickness of 97.30 nm, a fourth layer having an index of refraction of 1.77 and film thickness of 92.30 nm, a fifth layer having an index of refraction of 1.88 and a film thickness of 93.90 nm, and a sixth layer having an index of refraction of 1.40 and a film thickness of 91.00 nm, or said structure of said 7 layers of thin films comprises a first layer having an index of refraction of 1.64 and a film thickness of 92.50 nm, a second layer having an index of refraction of 1.47 and a film thickness of 90.60 nm, a third layer having an index of refraction of 1.40 and a film thickness of 91.20 nm, a fourth layer having an index of refraction of 1.66 and a film thickness of 99.40 nm, a fifth layer having an index of refraction of 1.74 and a film thickness of 95.80 nm, a sixth layer having an index of refraction of 1.89 and a film thickness of 93.20 nm, and a seventh layer having an index of refraction of 1.40 and a film thickness of 91.00 nm.

4. A light reflective display medium, comprising: a reflective display; and an anti-reflection film applied on a front surface of a display screen of said reflective display and having reflectance minima in at least three wavelength regions containing respective three wavelength regions of three primary colors, wherein said anti-reflection film comprises: a structure of 6 or 7 layers of thin films which are different from each other in at least one of an index of refraction and a film thickness, and wherein said structure of said 6 layers of thin films comprises a first layer having an index of refraction 1.40 and a film thickness of 93.10 nm, a second layer having an index of refraction of 1.46 and a film thickness of 94.40 nm, a third layer having an index of refraction of 1.78 and a film thickness of 95.40 nm, a fourth layer having an index of refraction of 1.81 and a film thickness of 92.30 nm, a fifth layer having an index of refraction of 1.90 and a film thickness of 92.90 nm, and a sixth layer having an index of refraction of 1.40 and a film thickness of 90.90 nm, or a first layer having an index of refraction of 1.42 and a film thickness of 91.30 nm, a second layer having an index of refraction of 1.45 and a film thickness of 92.00 nm, a third layer having an index of refraction of 1.70 and a film thickness of 97.30 nm, a fourth layer having an index of refraction of 1.77 and a film thickness of 92.30 nm, a fifth layer having an index of refraction of 1.88 and a film thickness of 93.90 nm, and a sixth layer having an index of refraction of 1.40 and a film thickness of 91.00 nm, or said structure of said 7 layers of thin films comprises a first layer having an index of refraction of 1.64 and a film thickness of 92.50 nm, a second layer having an index of refraction of 1.47 and a film thickness of 90.60 nm, a third laser having an index of refraction of 1.40 and a film thickness of 91.20 nm, a fourth layer having an index of refraction of 1.66 and a film thickness of 99.40 nm, a fifth layer having an index of refraction of 1.74 and a film thickness of 95.80 nm, a sixth layer having an index of refraction of 1.89 and a film thickness of 93.20 nm, and a seventh layer having an index of refraction of 1.40 and a film thickness of 91.00 nm.

5. An organic EL display device of self-light emitting type, comprising:
   an organic EL display of the self-light emitting type, including a light emitting layer of organic compounds having light emission maxima in respective three wavelength regions of three primary colors; and
   an anti-reflection film applied on a front surface of a display screen of said organic EL display and having reflectance minima in at least three wavelength regions containing said respective three wavelength regions of said three primary colors,
   wherein said anti-reflection film comprises: a structure of 6 or 7 layers of thin films which are different from each other in at least one of an index of refraction and a film thickness, and
   wherein said structure of said 6 layers of thin films comprises a first layer having an index of refraction 1.40 and a film thickness of 93.10 nm, a second layer having an index of refraction of 1.46 and a film thickness of 94.40 nm, a third layer having an index of refraction of 1.78 and a film thickness of 95.40 nm, a fourth layer having an index of refraction of 1.81 and a film thickness of 92.30 nm, a fifth layer having an index of refraction of 1.90 and a film thickness of 92.90 nm, and a sixth layer having an index of refraction of 1.40 and a film thickness of 90.90 nm, or a first layer having an index of refraction of 1.42 and a film thickness of 91.30 nm, a second layer having an index of refraction of 1.45 and a film thickness of 92.00 nm, a third layer having an index of refraction of 1.70 and a film thickness of 97.30 nm, a fourth layer having an index of refraction of 1.77 and a film thickness of 92.30 nm, a fifth layer having an index of refraction of 1.88 and a film thickness of 93.90 nm, and a sixth layer having an index of refraction of 1.40 and a film thickness of 91.00 nm, or
   said structure of said 7 layers of thin films comprises a first layer having an index of refraction of 1.64 and a film thickness of 92.50 nm, a second layer having an index of refraction of 1.47 and a film thickness of 90.60 nm, a third layer having an index of refraction of 1.40 and a film thickness of 91.20 nm, a fourth layer having an index of refraction of 1.66 and a film thickness of 99.40 nm, a fifth layer having an index of refraction of 1.74 and a film thickness of 95.80 nm, a sixth layer having an index of refraction of 1.89 and a film thickness of 93.20 nm, and a seventh layer having an index of refraction of 1.40 and a film thickness of 91.00 nm.

6. A liquid crystal monitor using an organic EL device, comprising:
   a liquid crystal display;
   a display screen of said liquid crystal display;
   an anti-reflection film applied on a front surface of said display screen and having reflectance minima in at least three wavelength regions containing respective three wavelength regions of three primary colors; and
   an organic EL device as a backlight comprising a light emitting layer having light emission maxima in said respective three wavelength regions of said three primary colors,
   wherein said anti-reflection film comprises: a structure of 6 or 7 layers of thin films which are different from each other in at least one of an index of refraction and a film thickness, and
   wherein said structure of said 6 layers of thin films comprises a first layer having an index of refraction 1.40 and a film thickness of 93.10 nm, a second layer having an index of refraction of 1.46 and a film thickness of 94.40 nm, a third layer having an index of refraction of 1.78 and a film thickness of 95.40 nm, a fourth layer having an index of refraction of 1.81 and a film thickness of 92.30 nm, a fifth layer having an index of refraction of 1.90 and a film thickness of 92.90 nm, and a sixth layer having an index of refraction of 1.40 and a film thickness of 90.90 nm, or a first layer having an index of refraction of 1.42 and a film thickness of 91.30 nm, a second layer having an index of refraction of 1.45 and a film thickness of 92.00 nm, a third layer having an index of refraction of 1.70 and a film thickness of 97.30 nm, a fourth layer having an index of 1.77 and a film thickness of 92.30 nm, a fifth layer having an index of refraction of 1.88 and a film thickness of 93.90 nm, and a sixth layer having an index of refraction of 1.40 and a film thickness of 91.00 nm, or
   said structure of said 7 layers of thin films comprises a first layer having an index of refraction of 1.64 and a film thickness of 92.50 nm, a second layer having an index of refraction of 1.47 and a film thickness of 90.60 nm, a third layer having an index of refraction of 1.40 and a film thickness of 91.20 nm, a fourth layer having an index of refraction of 1.66 and a film thickness of 99.40 nm, a fifth layer having an index of refraction of 1.74 and a film thickness of 95.80 nm, a sixth layer having an index of refraction of 1.89 and a film thickness of 93.20 nm, and a seventh layer having an index of refraction of 1.40 and a film thickness of 91.00 nm.

7. The anti-reflection film according to claim 1, where said respective three wavelength regions of said three primary colors are 450±20 nm, 540±20 nm and 610±20 nm, respectively.

8. The anti-reflection film according to claim 1, wherein said respective three wavelength regions of said three primary colors are 450±10 nm, 540±10 nm and 610±10 nm, respectively.

9. An anti-reflection film having
   reflectance minima in at least three wavelength regions containing respective three wavelength regions of three primary colors, said anti-reflection film comprising:

a structure of 6 layers of thin films which are different from each other in at least one of an index of refraction and a film thickness,
wherein said structure of said 6 layers of thin films comprises a first layer having an index of refraction of 1.42 and a film thickness of 91.30 nm, a second layer having an index of refraction of 1.45 and a film thickness of 92.00 nm, a third layer having an index of refraction of 1.70 and a film thickness of 97.30 nm, a fourth layer having an index of refraction of 1.77 and a film thickness of 92.30 nm, a fifth layer having an index of refraction of 1.88 and a film thickness of 93.90 nm, and a sixth layer having an index of refraction of 1.40 and a film thickness of 91.00 nm.

10. An anti-reflection film, having
reflectance minima in at least three wavelength regions containing respective three wavelength regions of three primary colors, said anti-reflection film comprising:
a structure of 7 layers of thin films which are different from each other in at least one of an index of refraction and film thickness,
wherein said structure of said 7 layers of thin films comprises a first layer having an index of refraction of 1.64 and a film thickness of 92.50 nm, a second layer having an index of refraction of 1.47 and a film thickness of 90.60 nm, a third layer having an index of refraction of 1.40 and a film thickness of 91.20 nm, a fourth layer having an index of refraction of 1.66 and a film thickness of 99.40 nm, a fifth layer having an index of refraction of 1.74 and a film thickness of 95.80 nm, a sixth layer having an index of refraction of 1.89 and a film thickness of 93.20 nm, and a seventh layer having an index of refraction of 1.40 and a film thickness of 91.00 nm.

11. The self-light emitting display medium according to claim 2, wherein said self-light emitting display comprises a cathode ray tube display.

12. The liquid crystal display medium according to claim 3, wherein said liquid crystal display comprises a transmission liquid crystal display and a translucent liquid crystal display.

13. The light reflective display medium according to claim 4, wherein said reflective display comprises a reflective liquid crystal display.

14. The light reflective display medium according to claim 13, wherein said reflective liquid crystal display comprises three color filters of red, green and blue in said display screen, said three color filters having light transmittance maxima in said respective three wavelength regions of said three primary colors.

15. The organic EL display device according to claim 5, wherein said organic EL display further comprises a substrate; a transparent electrode; and a back electrode, and wherein said transparent electrode, said light emitting layer of organic compounds and said back electrode are laminated in order on said substrate.

16. The organic EL display device according to claim 5, wherein said respective three wavelength regions of said three primary colors are 450±20 nm, 540±20 nm and 610±20 nm, respectively.

17. The organic EL display device according to claim 5, wherein said respective three wavelength regions of said three primary colors are 450±10 nm, 540±10 nm and 610±10 nm, respectively.

18. The organic EL display device according to claim 15, wherein a first light emitting material displaying blue color light emission, a second light emitting material displaying green color light emission and a third light emitting material displaying red color light emission are used in said light emitting layer of said organic compounds, and said first, second and third light emitting materials are singlet light emitting materials.

19. The organic EL display device according to claim 15, wherein
said first light emitting material has an organic compound shown by the following chemical formula (1) that displays blue color fluorescent light emission, having a maximum wavelength of light emission of 443 nm,
said second light emitting material has an organic compound shown by the following chemical formula (2) that displays green color fluorescent light emission, having a maximum wavelength of light emission at 547 nm, and
said third light emitting material has an organic compound shown by the following chemical formula (3) that displays red color fluorescent light emission, having a maximum wavelength of light emission at 615 nm,

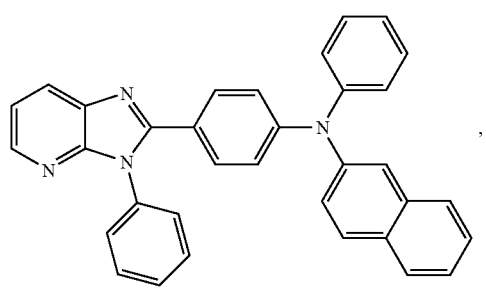

(1)

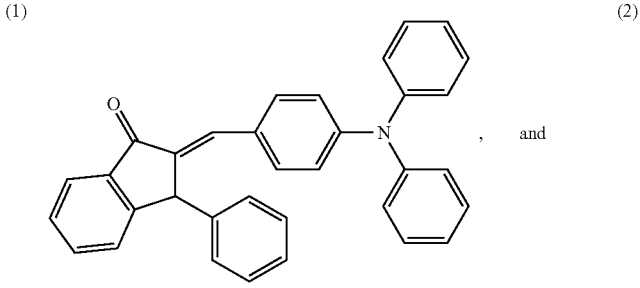

(2)

, and

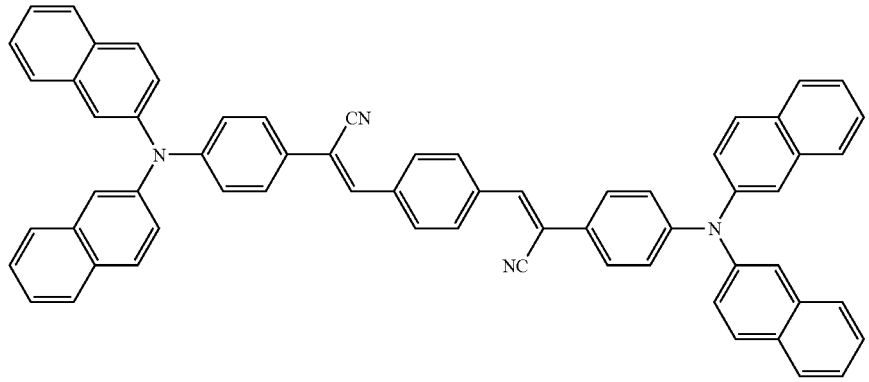

(3)

20. The liquid crystal monitor according to claim 6, wherein said liquid crystal display comprises a transmission liquid crystal display, or a translucent liquid crystal display.

21. The anti-reflection film according to claim 9, where said respective three wavelength regions of said three primary colors are 450±20 nm, 540±20 nm and 610±20 nm, respectively.

22. The anti-reflection film according to claim 9, where said respective three wavelength regions of said three primary colors are 450±10 nm, 540±10 nm and 610±10 nm, respectively.

23. The anti-reflection film according to claim 10, where said respective three wavelength regions of said three primary colors are 450±20 nm, 540±20 nm and 610±20 nm, respectively.

24. The anti-reflection film according to claim 10, where said respective three wavelength regions of said three primary colors are 450±10 nm, 540±10 nm and 610±10 nm, respectively.

25. The self-light emitting display medium according to claim 2, where said respective three wavelength regions of said three primary colors are 450±20 nm, 540±20 nm and 610±20 nm, respectively.

26. The liquid crystal display medium according to claim 3, where said respective three wavelength regions of said three primary colors are 450±20 nm, 540±20 nm and 610±20 nm, respectively.

27. The light reflective display medium according to claim 4, where said respective three wavelength regions of said three primary colors are 450±20 nm, 540±20 nm and 610±20 nm, respectively.

28. The liquid crystal monitor according to claim 6, where said respective three wavelength regions of said three primary colors are 450±20 nm, 540±20 nm and 610±20 nm, respectively.

* * * * *